United States Patent
Feldmann et al.

(10) Patent No.: US 6,331,011 B1
(45) Date of Patent: Dec. 18, 2001

(54) WHEEL GUARD FOR TWO-WHEELED VEHICLES

(75) Inventors: Stefan Feldmann, Sundern; Oliver Wahl, Essen, both of (DE)

(73) Assignee: SKS metaplast Scheffer-Klute GmbH, Sundern (DE)

( * ) Notice: Subject to any disclaimer, the term of this patent is extended or adjusted under 35 U.S.C. 154(b) by 0 days.

(21) Appl. No.: 09/502,955

(22) Filed: Feb. 11, 2000

(30) Foreign Application Priority Data

Feb. 15, 1999 (DE) .............................................. 299 02 644

(51) Int. Cl.[7] .................................................. B62D 25/18
(52) U.S. Cl. ..................................... 280/152.1; 280/152.3; 280/852
(58) Field of Search ........................... 280/152.1, 152.2, 280/852, 160.1, 152.3

(56) References Cited

U.S. PATENT DOCUMENTS

| | | | |
|---|---|---|---|
| 4,620,713 | * 11/1986 | Sakaguchi | 280/152.3 |
| 5,322,311 | * 6/1994 | Dunn | 280/152.1 |
| 5,961,136 | * 10/1999 | Tseng | 280/152.3 |
| 6,073,948 | * 6/2000 | Motojima et al. | 280/152.2 |

FOREIGN PATENT DOCUMENTS

| | | | |
|---|---|---|---|
| 86 05 731 U1 | 3/1986 | (DE) . | |
| 88 04 650 | 6/1988 | (DE) . | |
| 91 08 780 U1 | 7/1991 | (DE) . | |
| 297 00 562 U1 | 1/1997 | (DE) . | |
| 968487 | * 11/1950 | (FR) | 280/152.1 |
| 22510 | * 9/1910 | (GB) | 280/152.1 |
| 250053 | 10/1982 | (TW) . | |

* cited by examiner

*Primary Examiner*—Douglas Hess
*Assistant Examiner*—Elaine Gort
(74) *Attorney, Agent, or Firm*—Hoffman, Wasson & Gitler, P.C.

(57) ABSTRACT

Wheel guard for a two-wheeled vehicle comprising a device for detachably fastening the wheel guard proximate to the fork of the two-wheeled vehicle, in which the fastening device has at least one expansion element (10) that can be inserted into a tubular part (11) of the fork and clamped in place there, and at least one sliding element (12) that can be joined with the expansion element, wherein the sliding element can be inserted into a groove (13) or rail on the wheel guard (14), and detachably fixed in an end position.

The object of this invention is to create a wheel guard for a two-wheeled vehicle with a device for detachably fastening the wheel guard proximate to the fork of the two-wheeled vehicle, in which the wheel guard can be disassembled or assembled easily without a tool, wherein the wheel guard fastening device is also suitable for two-wheeled vehicles with spring-mounted front wheel forks.

13 Claims, 5 Drawing Sheets

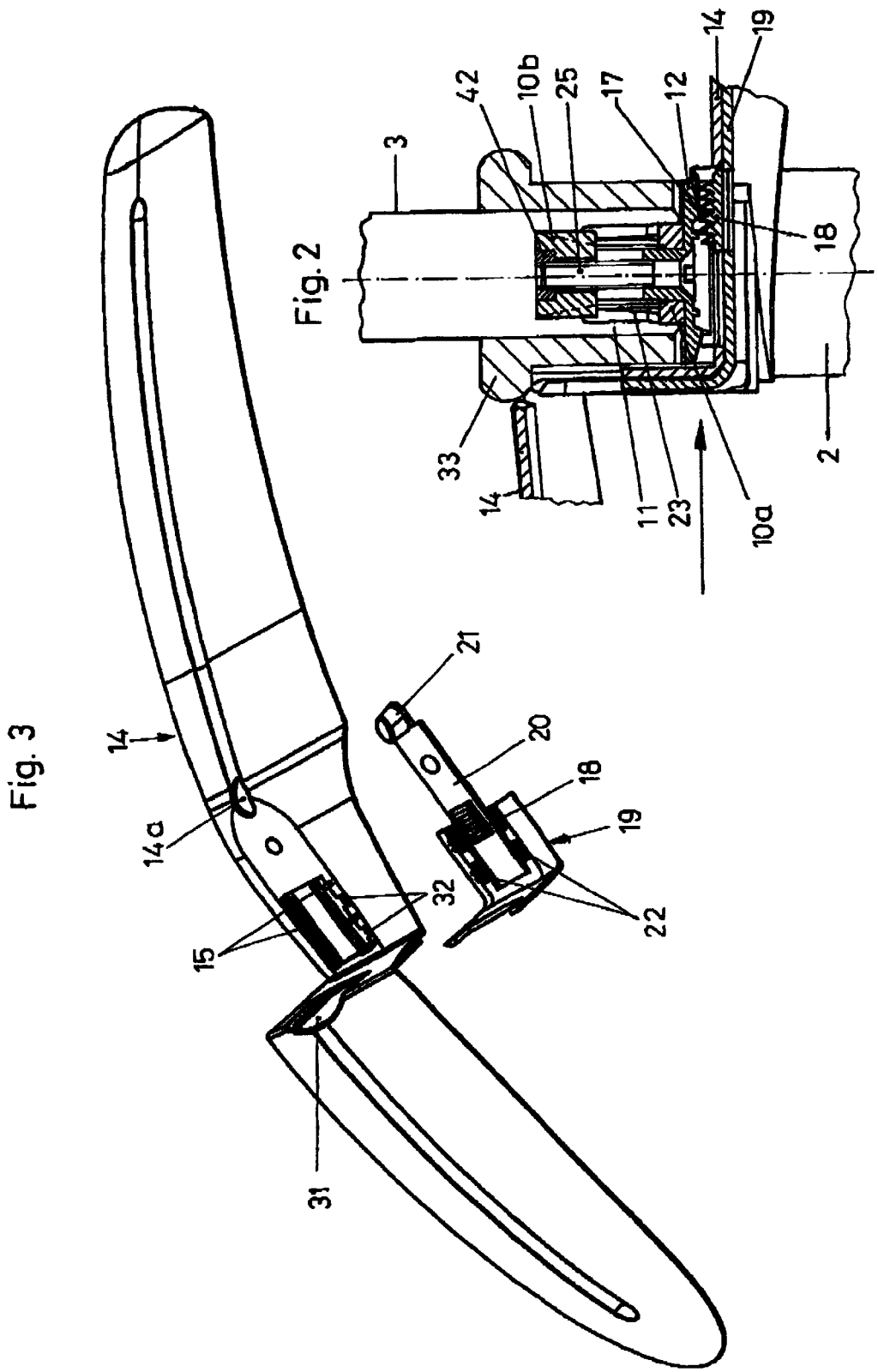

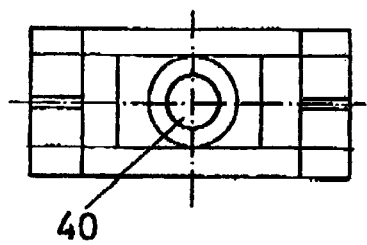
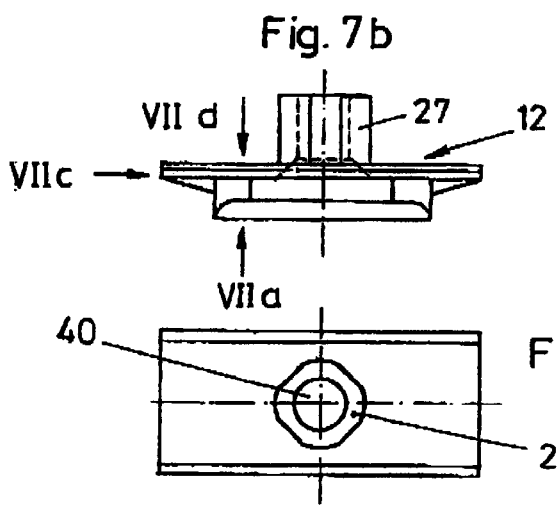
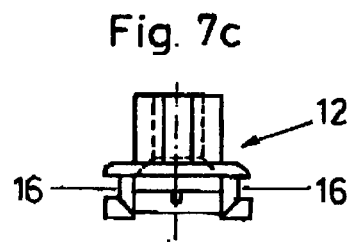
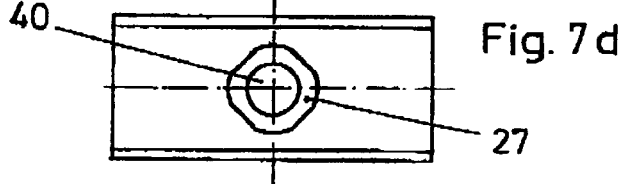
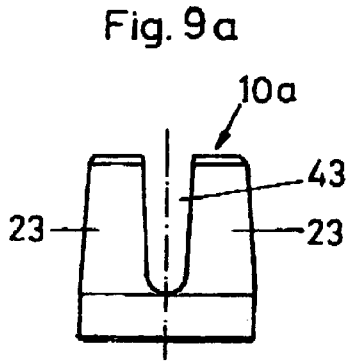
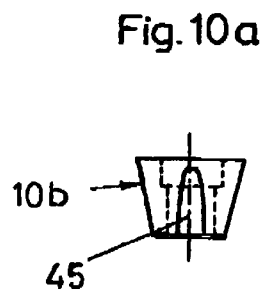
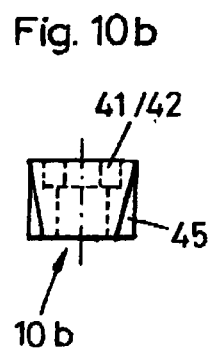
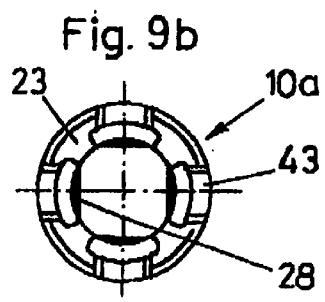
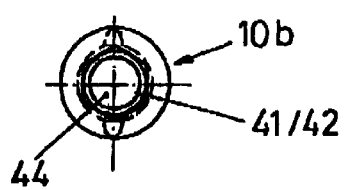
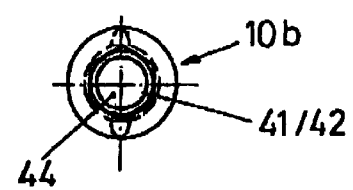

WHEEL GUARD FOR TWO-WHEELED VEHICLES

This invention relates to a wheel guard for a two-wheeled vehicle, comprising a device for detachably fastening the wheel guard proximate to the fork of the two-wheeled vehicle.

In the case of modern two-wheeled vehicles, in particular so-called mountain bikes, users are known to ride either with or without wheel guards, depending on the weather. The wheel guard is usually not needed in good weather, so that there is interest in creating an easily detachable device for fastening the wheel guard that enables the user to detach the wheel guard from the front wheel of the two-wheeled vehicle, preferably without tools. On the other hand, many two-wheeled vehicles, in particular mountain bikes, which are ridden off-road, are already equipped with a spring-mounted front wheel fork to achieve a corresponding shock-absorption effect when the rider is riding on an uneven surface with potholes and the like. Previously known two-wheeled vehicles with detachable wheel guards for the front wheel generally have fastening devices that are cumbersome and permit assembly only with the help of a tool. In addition, the fastening devices for the wheel guards are not always suitable for two-wheeled vehicles with spring-mounted front wheel forks.

Therefore, the object of this invention is to create a wheel guard for a two-wheeled vehicle with a device for detachably fastening the wheel guard proximate to the fork of the two-wheeled vehicle, in which the wheel guard can be disassembled or assembled easily without a tool, wherein the wheel guard fastening device is also suitable for two-wheeled vehicles with spring-mounted front wheel forks.

This object is achieved by a wheel guard according to the invention for a two-wheeled vehicle of the kind mentioned at the outset, in which the device for fastening the wheel guard comprises at least one expansion element that can be inserted into a tubular part of the fork and clamped in place there, and at least one sliding element that can be joined with the expansion element, wherein the sliding element can be inserted into a groove or rail on the wheel guard, and detachably fixed in an end position.

The mentioned sliding element can be plate-shaped, for example, and inserted into a rail-like part molded onto the wheel guard. In a preferred structural solution, for example, this can be done by having the sliding element exhibit lateral grooves, into which engage segments of the rail-like parts molded onto the wheel guard. For example, a latching device that is preferably mounted under the sliding element and interacts with corresponding latching elements on the wheel guard can be used to detachably fasten the sliding element to the wheel guard. In one preferred further development according to the invention, an elbow is fastened to the wheel guard, usually in a detachable manner, and the mentioned latching elements for the sliding element are molded onto the elbow. The wheel guard can be detached, for example, by molding a elastic tongue onto the elbow, wherein the tongue is adjacent to the latching elements, and can then be pushed down, thereby disengaging the latching elements with the latching device on the sliding element. To this end, the elastic tongue exhibits an unlatching device at its end, for example, which preferably can be operated from the top of the wheel guard, wherein, after unlatched by exerting pressure from above, the sliding element can slide out of the rail-like molded on parts, so that the wheel guard can be detached.

The mentioned elbow need not be detached from the wheel guard during normal use. The ability to detachably fasten the elbow to the wheel guard, preferably through latching by means of latching elements, offers mainly production-related advantages during assembly at the manufacturer.

In principle, then, this invention involves the interaction between two elements that constitute the fastening device of the wheel guard, the first being the expansion element, which can be inserted into a tubular part of the fork (front wheel fork) of the two-wheeled vehicle and clamped in place there. When detaching the wheel guard from the two-wheeled vehicle, this expansion element can then remain inside the fork, even if the user subsequently rides the bicycle without a wheel guard, so that when the wheel guard is needed again later on, it can be refastened by hand in just a few steps, specifically by way of the mentioned sliding element, which represents the second key element of the fastening device, and can be joined with the expansion element, wherein the sliding element can also remain on the front wheel fork when detaching the wheel guard. The wheel guard is detached from this sliding element in a simple sliding motion, wherein an unlatching device is preferably disengaged first, and the wheel guard can be slid out of the sliding element only thereafter.

In a preferred further development of the invention, the expansion element comprises at least one expansion sleeve along with an expansion cone, which moves parts of the expansion sleeve radially toward the outside when pushed into the expansion sleeve, thereby clamping the expansion sleeve inside the tubular part of the fork. To this end, radially elastic tongues are preferably molded onto the expansion sleeve. In addition, the expansion cone preferably exhibits an internal thread, which can also be situated on an inserted nut, for example, and a screw is provided that engages the thread of the expansion cone axially through a hole in the expansion sleeve. These screws can then be tightened, which draws the expansion cone into the expansion sleeve, as a result of which the radially elastic tongues of the expansion sleeve expand outwardly, becoming clamped inside the tubular part of the fork. As already mentioned, however, the user generally mounts the sliding element and expansion element on the front wheel fork only if retrofitting with such a detachable wheel guard is desired, so that the screw need only be loosened in that case, or given a defect, e.g., damage to the sliding element, while this screw does not have to be loosened to remove the wheel guard, so that no tool is required.

In a preferred further development of the invention, the wheel guard exhibits a stepped offset in the area where it is fastened to the front wheel fork. A vertical wheel guard wall is located proximate to this stepped offset. This vertical wall preferably has one recess or opening, and is shaped in such a way that the wheel guard can glide by the fixed part of the front wheel when spring-mounting the front wheel fork. This is because front wheel forks often have an annular ring at about the height of the wheel guard that provides the required space when spring-mounting the front wheel fork. The opening or recess preferred according to the invention makes it possible to mount the wheel guard flush against the front wheel fork proximate to the vertical wall of the stepped offset.

The features mentioned in the subclaims relate to preferred further developments of the invention. Additional advantages to the invention become apparent in the following detailed description.

This invention shall be described in greater detail based on embodiments with reference to the attached drawings. Shown in:

FIG. 2 is a magnified detailed view of a section 11 from FIG. 1, partial section;

FIG. 3 is an exploded view of a wheel guard according to the invention as well as the elbow attachable thereto;

FIG. 6b is a front view of the elbow in FIG. 6a;

FIG. 6d is a top view of the elbow in FIG. 6a;

FIG. 7a is a view of the sliding element according to the invention, from below;

FIG. 7b is a side view of the sliding element in FIG. 7a;

FIG. 7c is a front view of the sliding element in FIG. 7a;

FIG. 7d is a top view of the sliding element in FIG. 7a;

FIG. 9a is a side view of the expansion sleeve;

FIG. 9b is a top view of the expansion sleeve in FIG. 9a;

FIG. 10a is a side view of an expansion cone for fastening the wheel guard according to the invention;

FIG. 10b is another view of the expansion cone in FIG. 10a;

FIG. 10c is a top view of the expansion cone in FIG. 10a.

Figure 1:
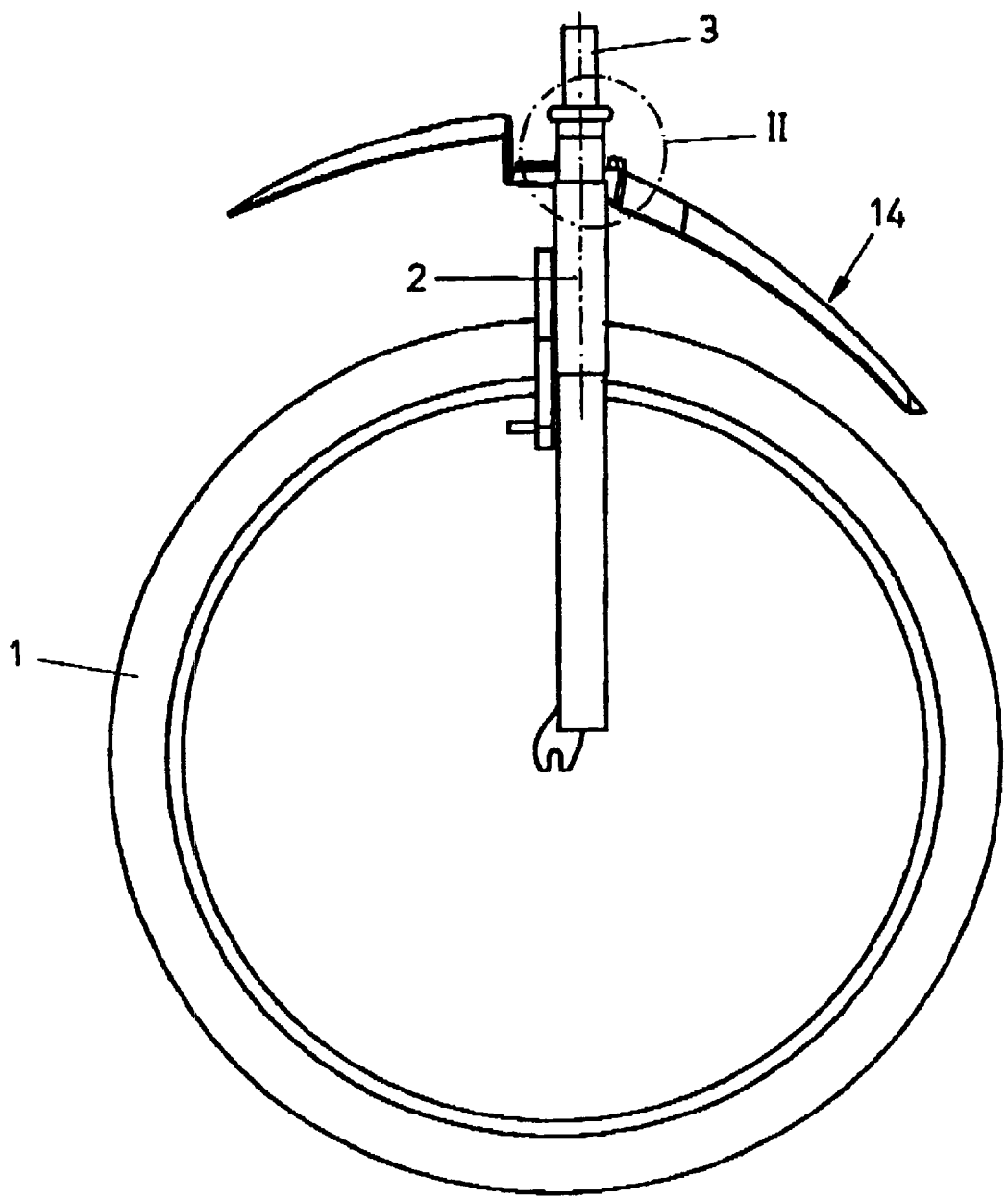
FIG. 1 is a schematically simplified view of a wheel guard fastened proximate to the fork of a bicycle.

Reference will first be made to FIG. 1. This figure presents a schematically simplified view of a section of a bicycle proximate to front wheel 1, wherein this bicycle is equipped with a so-called spring-mounted front wheel fork 2. In the invention, a wheel guard 14 is detachably fastened to this spring-mounted front wheel fork 2, so that it can be removed when needed if the owner of the bicycle wants to ride it without the front wheel guard.

The stepped shape of the wheel guard 14 shown in FIG. 1 stems from the spring-mounted wheel fork 2, in which an upper part 3 of the fork, which leads to the handlebars (not shown), is resiliently connected in an axially shiftable way with a lower part of the front wheel fork. The magnified view in FIG. 2 provides a better look at the area where wheel guard 14 and front wheel fork 2, 3 are connected. As evident from this figure, the upper part of the bicycle fork encompasses a tubular part 11 open toward the bottom, into which parts of the device for fastening the wheel guard can be inserted, specifically an expansion element 10, which preferably incorporates an expansion sleeve 10a in the embodiment according to FIG. 2, as well as an expansion cone 10b. When expansion cone 10b is pushed into expansion sleeve 10a, e.g., by tightening screw 25, which engages a nut 42 placed inside expansion cone 10b, then expansion cone I Ob shifts in an axial direction relative to expansion sleeve 10a, i.e., expansion cone I Ob moves downward in the drawing according to FIG. 2. As a result, parts of expansion sleeve 10a are moved radially toward the outside (expanding motion), and expansion sleeve 10a is in turn clamped inside the tubular part 11 of the fork.

As evident from FIG. 2, the fastening device for the wheel guard 14 also comprises an elbow 19, which is essentially flat, and passes through the approximately right-angled bend in the wheel guard step. Elbow 19 is preferably detachably fastened to the wheel guard 14. Elbow 19 has latching elements 18, whose cross section can be serrated, for example. These latching elements 18 are also visible in the perspective view according to FIG. 3. These latching elements interact with a latching device 17 underneath sliding element 12, which will be described in greater detail below. However, FIG. 2 illustrates how this latching device 17 engages the serrated latching elements 18. The user fastens wheel guard 34 by sliding it onto sliding element 12 in the direction of the arrow shown in FIG. 2 until the end position shown in FIG. 2 has been reached, where a locking is achieved. In other words, sliding element 12 usually remains on the bicycle fork when removing wheel guard 14. This means that screw 25, which secures sliding element 12 and the expansion element with expansion sleeve 10a and expansion cone 10b, remains in the fastening position shown in FIG. 2 in tubular part 11 of the fork, if necessary even if the user uses the bicycle without wheel guard 14. Therefore, expansion sleeve 10a and sliding element 12 are generally mounted by the user, e.g., for retrofitting purposes. However, the key factor here is that the entire fastening device for the wheel guard is conceived in such a way that the bicycle user can remove the wheel guard without the need of a tool. This shall be explained in greater detail below.

Figure 4:
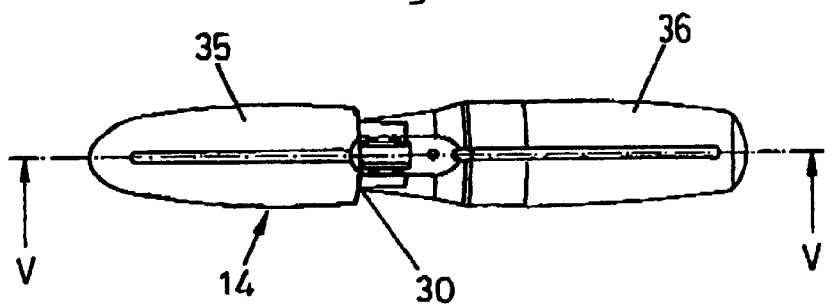
FIG. 4 is a top view of the wheel guard according to the invention.
Figure 5:
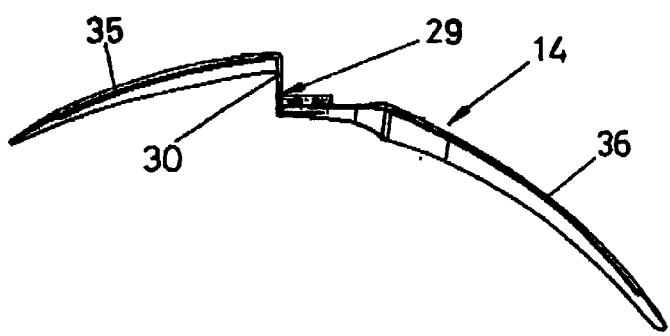
FIG. 5 is a longitudinal sectional view of the wheel guard according to the invention along line V—V in FIG. 4.

The wheel guard shall first be explained in greater detail drawing reference to FIGS. 3 to 5. FIG. 3 shows wheel guard 14 and elbow 19 detached from it. Latching elements 18 are visible on the elbow for joining with sliding element 12. In addition, elbow 19 has a molded-on, relatively long stretched-out elastic tongue 20 extending to one side, which not only accommodates latching elements 18 on the top side, but also a unlatching device 21 at its end, e.g., shaped like a button. This unlatching device 21 is there to detach wheel guard 14 from the bicycle fork without a too]. As can be seen, wheel guard 14 has an opening 14a that accommodates unlatching device 21, so that the unlatching device projects partially through wheel guard 14 toward the top in the form of a button 21 or the like. Since tongue 20 is downwardly elastic, the user can press the top of tongue 20 when detaching, as a result of which latching elements 18 on tongue 20 disengage from latching device 17, which is situated on sliding element 12 (see FIG. 2). FIG. 3 does not show sliding element 12. However, FIG. 3 does depict the approximately rail-like molded part 15 on wheel guard 14, into which sliding element 12, which exhibits lateral grooves 16 visible in FIG. 7c, can be inserted in the longitudinal direction of wheel guard 14; conversely, after detaching unlatching device 21, wheel guard 14 is shifted against the direction of the arrow shown in FIG. 2, since latching device 17/18 is detached as long as tongue 20 is pressed down, and wheel guard 14 can then be removed from the bicycle.

As evident from FIG. 3, elbow 19 also has additional latching elements 22, which each are situated laterally on both sides next to tongue 20, and corresponding latch openings 32 allocated to these latching elements 22 are provided on wheel guard 14, so that elbow 19 can also be detachably fastened to wheel guard 14. This detaching is usually not required when removing wheel guard 14 from the bicycle, but may become necessary if elbow 19 is damaged, for example. In addition, this facilitates assembly of the elbow to wheel guard 14 via latching elements 22 during production.

As evident from FIGS. 3, 4 and 5, wheel guard 14 is also shaped in such a way as to exhibit a stepped offset 29 proximate to the fastening device when viewed from the side, while elbow 19 is dimensioned to the height of the step of this stepped offset 29, and secured to wheel guard 14 in this area. In addition, one can see that wheel guard 14 proximate to vertical wall 30 exhibits a recess 31 above stepped offset 29, namely above elbow 19 (with elbow attached), as also visible in FIG. 2. This recess 31 is provided because wheel guard 14 moves relative to a fixed part of the front wheel when spring-mounted fork 2 of the front wheel compresses. This ensures sufficient space for the wheel guard as it glides past. As evident from FIG. 3, recess 31 is formed by a radius when viewed from above, meaning that it describes a semi-circular arc, and hence corresponds to the peripheral shape of annular ring 33 for the ball bearing trigger equipment.

The trigger equipment (annular ring) and wheel guard do not move toward each other. They are both fastened to the spring-mounted part of the fork. The narrow point is the distance between the trigger equipment and fastening flange that joins both fork tubes. The wheel guard does not additionally constrict this narrow point, since the wheel guard uses the space between the protruding trigger equipment and the fork bridge via opening FIGS. 4 and 5 again show wheel guard 14 without elbow 19 in a longitudinal section and top view. Wheel guard 14 has a front, bent section 35, from which vertical wall 30 then extends downward. This is followed by stepped offset 29, where elbow 19 is incorporated (see also FIG. 3). After the stepped offset 29, the wheel guard first keeps going straight for a short distance, again followed by a back, bent section 36.

Figure 6B:
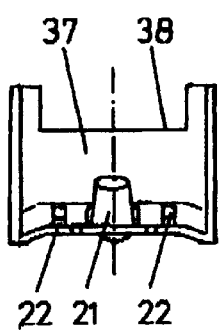
Figure 6A:
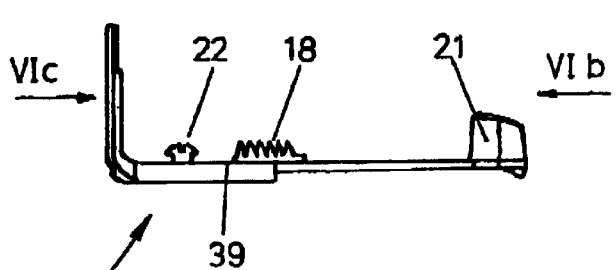
FIG. 6a is a side view of the elbow according to the invention.
Figure 6C:
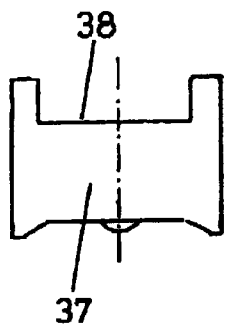
FIG. 6c is a view of the elbow in FIG. 6a from the other side.
Figure 6D:
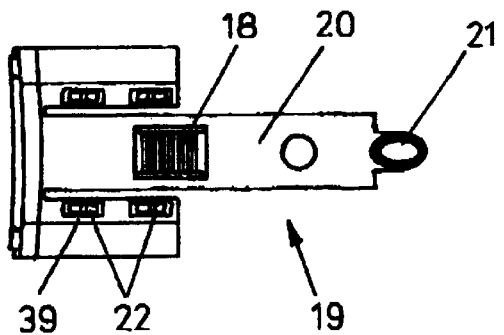

FIGS. 6a to 6d again depict various views of elbow 19 by itself. FIG. 6d shows elastic tongue 20 with unlatching device 21 at the end, and also latching elements 22 for establishing a connection with the wheel guard, and latching elements 18, which interact with latching device 17 of sliding element 12. Two latching elements 22 are provided on either side, while latching elements 18 are located on elastic tongue 20 at a distance from its end. FIG. 6b also shows a rectangular recess 38 in vertical section 37 of elbow 19 at the top, which is allocated to recess 31 in the wheel guard. According to FIG. 6d, latching elements 22 are situated on a horizontal section 39 of elbow 19, in the middle of which the released, and hence elastic tongue 20 is in turn located.

FIGS. 7a to 7d again show details of the sliding element 12 in several views. FIG. 7c depicts lateral grooves 16 exhibited by sliding element 12, into which parts of rail-like parts 15 that are molded on wheel guard 14 and visible in FIG. 3 engage from the side. Therefore, shifting wheel guard 14 relative to sliding element 12 results in a kind of rail guide.

As evident from the top view in FIG. 7d, the top of approximately plate-shaped sliding element 12 exhibits a polygonal molded-on part 27. In this regard, reference is also made to the exploded view in FIG. 8. This polygonal molded-on part 27 is used to mount expansion sleeve 10a, which exhibits a correspondingly shaped recess 28, on sliding element 12 in a torsion resistant manner. The approximately octagonal recess 28 of expansion sleeve 10a is depicted in FIG. 9b. As evident from FIG. 7a, sliding element 12 also has a central, through hole 40, so that the screw 25 shown in FIG. 8 can be pushed through this hole.

Figure 8:
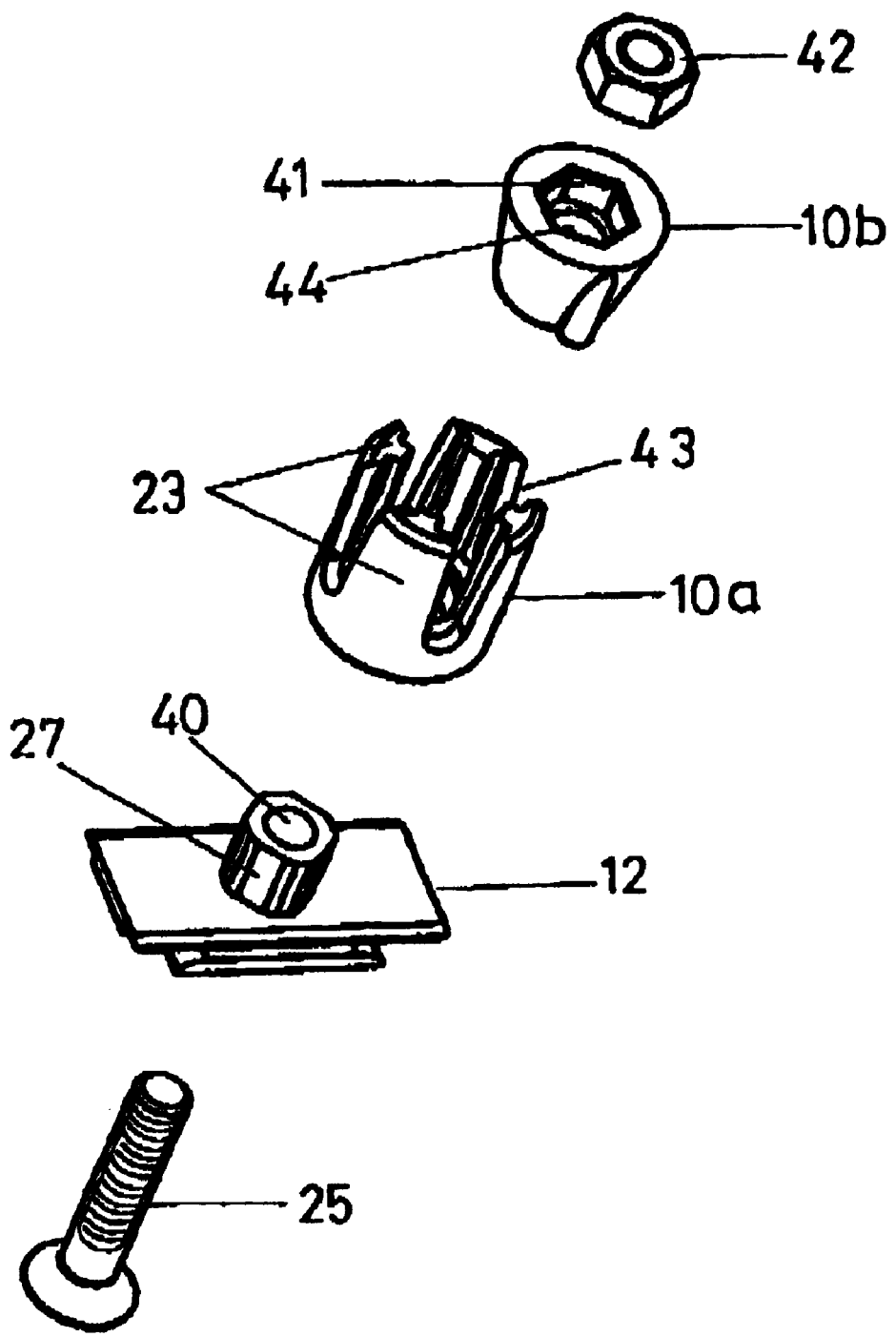
FIG. 8 is an exploded view of a part of the wheel guard-fastening device.

The structure of the fastening device for the wheel guard is shown quite clearly in the exploded view in FIG. 8, and will be explained in greater detail based on this depiction. The figure shows sliding element 12 with its polygonal molded-on part 27 on the top, upon which expansion sleeve 10a is placed. Also visible is expansion cone I Ob, in which is inserted a nut 42 into which the thread of screw 25 engages. Reference is also made to FIG. 2. The upper side of expansion cone 10 also has a hexagonal recess 41 that accommodates nut 42. Since expansion cone 10b is conical, and its lower end is narrower than its upper end, radially elastic tongues 23 of expansion sleeve 10a are pressed increasingly toward the outside as expansion cone 10b is screwed into expansion sleeve 10a, which in turn is accomplished by turning screw 25. We refer to the picture on FIG. 2. Since screw 25 extends through hole 40 of plate-shaped sliding element 12 with its threaded shank, the latter is fixed by screw 25 on bicycle fork 3, wherein the expanding effect of expansion cone 10b radially pressing apart expansion sleeve 10a clamps the expansion sleeve inside tubular part 11 of fork 3. Sliding element 12 is in turn detachably fastened to latching elements 18 of elbow 19 (see FIG. 2), wherein elbow 19 is in turn secured to wheel guard 14.

FIG. 9a and 9b show another two views of expansion sleeve 10a. Visible therein are radially elastic molded-on tongues 23, of which, for example, four are distributed around the periphery, and which have slits 43 running between them.

FIG. 10c shows hexagonal recess 41 in expansion cone 10b for nut 42, along with the central through hole 44 of the expansion cone. The outer, lateral molded-on parts 45 of the expansion cone can be used to guide expansion cone 10b into expansion sleeve 10a. These parts can extend into slit 43 of expansion sleeve 10a.

What is claimed is:

1. Wheel guard for a two-wheeled vehicle, comprising a device for detachably fastening the wheel guard proximate to the fork of the two-wheeled vehicle, characterized by the fact that the fastening device comprises at least one expansion element that can be inserted into a tubular part of the fork and clamped in place, and at least one sliding element that can be joined with the expansion element, wherein the sliding element can be inserted into a groove or rail on the wheel guard, and until it reaches an end position where it is detachably fixed, further characterized by the fact that the sliding element exhibits lateral grooves, into which engage parts of a rail-like part molded onto the wheel guard.

2. Wheel guard for a two-wheeled vehicle, comprising a device for detachably fastening the wheel guard proximate to the fork of the two-wheeled vehicle, characterized by the fact that the fastening device comprises at least one expansion element that can be inserted into a tubular part of the fork and clamped in place, and at least one sliding element that can be joined with the expansion element, wherein the sliding element can be inserted into a groove or rail on the wheel guard, and until it reaches an end position where it is detachably fixed, further characterized by the fact that the bottom side of the sliding element exhibits at least one latching device, which interacts with corresponding latching elements on the wheel guard.

3. Wheel guard according to claim 2, characterized by the fact that an elbow with molded-on latching elements can be fastened to the wheel guard.

4. Wheel guard according to claim 3, characterized by the fact that a elastic tongue with latching elements is molded onto the elbow.

5. Wheel guard according to claim 4, characterized by the fact that the elastic tongue exhibits an unlatching device at the end, which preferably can be operated from the upper side of the wheel guard, wherein, after unlatching, the sliding element can slide out of the rail-like molded on parts, so that the wheel guard can be detached.

6. Wheel guard for a two-wheeled vehicle, comprising a device for detachably fastening the wheel guard proximate to the fork of the two-wheeled vehicle, characterized by the fact that the fastening device comprises at least one expansion element that can be inserted into a tubular part of the fork and clamped in place, and at least one sliding element that can be joined with the expansion element, wherein the sliding element can be inserted into a groove or rail on the wheel guard, and until it reaches an end position where it is detachably fixed, further characterized by the fact that an elbow can be detachably fastened to the wheel guard, preferably latched to it by means of latching elements.

7. Wheel guard for a two-wheeled vehicle, comprising a device for detachably fastening the wheel guard proximate to the fork of the two-wheeled vehicle, characterized by the fact that the fastening device comprises at least one expansion element that can be inserted into a tubular part of the fork and clamped in place, and at least one sliding element that can be joined with the expansion element, wherein the sliding element can be inserted into a groove or rail on the wheel guard, and until it reaches an end position where it is detachably fixed, further characterized by the fact that the expansion element comprises at least one expansion sleeve, and that an expansion cone is provided, which moves parts of the expansion sleeve radially toward the outside when pushed into the expansion sleeve, thereby clamping the expansion sleeve inside the tubular part of the fork.

8. Wheel guard according to claim 7, characterized by the fact that radially elastic tongues are molded onto the expansion sleeve.

9. Wheel guard according to claim 7, characterized by the fact that a groove is inserted in the expansion cone, into which engages a screw that extends axially through a hole in the expansion sleeve.

10. Wheel guard according to claim 9, characterized by the fact that the expansion sleeve can be secured to the sliding element by means of the screw.

11. Wheel guard according to claim 7, characterized by the fact that the sliding element exhibits a polygonal molded-on part, on which the expansion sleeve with a correspondingly shaped recess is mounted in a torsion resistant manner.

12. Wheel guard for a two-wheeled vehicle, comprising a device for detachably fastening the wheel guard proximate to the fork of the two-wheeled vehicle, characterized by the fact that the fastening device comprises at least one expansion element that can be inserted into a tubular part of the fork and clamped in place there, and at least one sliding element that can be joined with the expansion element, wherein the sliding element can be inserted into a groove or rail on the wheel guard, and until it reaches an end position where it is detachably fixed, further characterized by the fact that it exhibits at least one stepped offset including a vertical wall proximate to the fastening device when viewed from the side, and that an elbow can be secured proximate to this offset on the bottom side of the wheel guard.

13. Wheel guard according to claim 12, characterized by the fact that it exhibits at least one recess or opening proximate to the vertical wall above the stepped offset, and above the elbow.

* * * * *